US009712751B2

United States Patent
Williams et al.

(10) Patent No.: US 9,712,751 B2
(45) Date of Patent: Jul. 18, 2017

(54) CAMERA FIELD OF VIEW EFFECTS BASED ON DEVICE ORIENTATION AND SCENE CONTENT

(71) Applicant: Apple Inc., Cupertino, CA (US)

(72) Inventors: Kenta K. Williams, Sunnyvale, CA (US); Ricardo Motta, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 14/602,832

(22) Filed: Jan. 22, 2015

(65) Prior Publication Data

US 2016/0219217 A1    Jul. 28, 2016

(51) Int. Cl.
*H04N 5/262* (2006.01)
*H04N 5/232* (2006.01)

(52) U.S. Cl.
CPC ..... *H04N 5/23293* (2013.01); *H04N 5/23229* (2013.01); *H04N 5/2628* (2013.01)

(58) Field of Classification Search
None
See application file for complete search history.

(56) References Cited

U.S. PATENT DOCUMENTS

| 7,034,848 B2 * | 4/2006 | Sobol ............... H04N 1/2104 345/619 |
| 8,249,388 B2 | 8/2012 | Xu |
| 2006/0064716 A1 * | 3/2006 | Sull ............... G06F 17/30793 725/37 |
| 2006/0072847 A1 * | 4/2006 | Chor ............... G06K 9/3233 382/282 |
| 2007/0236762 A1 * | 10/2007 | Tsuji ............... G06K 9/00228 358/537 |

* cited by examiner

*Primary Examiner* — Dakshesh Parikh
(74) *Attorney, Agent, or Firm* — Blank Rome LLP (57) ABSTRACT

Systems and methods to improve photo taking using an image capture device having a wide field of view (FOV) camera. In some embodiments, when the device is held in landscape orientation, a wide diagonal FOV may be displayed to the user on a preview screen of the device, and the landscape image may be captured in a wide, 16:9 aspect ratio. However, when the device is held in portrait orientation, the effective diagonal FOV of the device may be decreased via software and/or hardware, and a 4:3 aspect ratio image may be displayed and captured. In other embodiments, the captured portrait orientation image may be scaled, shifted, and/or cropped before being displayed to the user on the device's preview display screen, in such a manner that the user will naturally be inclined to hold the device in a position that will produce a more optimal self-portrait image.

28 Claims, 8 Drawing Sheets

CAMERA FIELD OF VIEW EFFECTS BASED ON DEVICE ORIENTATION AND SCENE CONTENT

BACKGROUND

This disclosure relates generally to the field of image capture, and more particularly, to acquiring images with a wide "field of view" (FOV) image sensor.

"Field of view," as used herein, refers to the angular extent of a given scene that is imaged by a camera. FOV is typically measured in terms of a number of degrees, and may be expressed as a vertical FOV, horizontal FOV, and/or diagonal FOV. The diagonal FOV of the image sensor is often referred to herein, as it is a more relevant measure of the camera's optics since it attempts to cover the corners of the image, where "roll off," i.e., vignetting, problems associated with pixels at the corners of the image sensor may become more pronounced. For reference, a typical 35 mm camera with a lens having a focal length of 50 mm will have a horizontal FOV of 39.6°, a vertical FOV of 27.0°, and a diagonal FOV of 46.8°.

For a given camera-to-subject distance, lenses with focal lengths shorter than the sensor diagonal (commonly known as wide angle lenses) will distort perspective, such that objects that are closer to the camera appear to be larger than they would with a normal lens, and distant objects appear to be smaller and further away. Because of this distortion, wide angle lenses are not typically used for portraits. Likewise a normal lens (e.g., with a focal length approximately equal to the sensor diagonal) is not typically used for landscape photography because of the limited field of view.

The advent of portable integrated computing devices has caused a wide proliferation of cameras and video devices. These integrated computing devices commonly take the form of smartphones or tablets and typically include general purpose computers, cameras, sophisticated user interfaces including touch sensitive screens, and wireless communications abilities through Wi-Fi, LTE, HSDPA and other cell-based or wireless technologies. The wide proliferation of these integrated devices provides opportunities to use the devices' capabilities to perform tasks that would otherwise require dedicated hardware and software. For example, as noted above, integrated devices such as smartphones and tablets typically have one or two embedded cameras. These cameras generally amount to lens/camera hardware modules that may be controlled through the general purpose computer using firmware and/or software (e.g., "Apps") and a user interface including the touch-screen fixed buttons and touchless control such as voice control.

The integration of cameras into communication devices such as smartphones and tablets has enabled people to share images and videos in ways never before possible. It is now very popular to acquire and immediately share photos with other people either by sending the photos via text message, SMS, or email, or by uploading the photos to an Internet-based service, such as a social networking site or a photo sharing site.

Along with the rise in popularity of portable integrated computing devices with integrated cameras has come a rise in the popularity of consumer photography. In particular, users often take so-called "selfies," which are portrait or self-portrait photographs of the user of the device (and/or others in the user's proximity), typically taken with a front-facing camera on the device, i.e., a camera that faces in the same direction as the camera device's preview display screen. Most prior art cameras are optimized for either wide angle general photography or for self-portraits and video streaming use cases. Those cameras that are optimized for wide angles are optimized for group and landscape compositions, but are not optimal for portraits, due, e.g., to the distortion that occurs when subjects are at short distances from the camera. Those cameras that are optimized for portraits and video conference streaming (e.g., "front-facing" cameras) are not optimal for landscapes and group photos because of their limited field of view. Moreover, cameras on devices that face in the opposite direction of the device's preview display screen (e.g., "rear-facing" cameras) are typically designed with a short focal length and wide field of view, which is not optimal for portraits, due, e.g., to distortion caused at short distances from the camera. The field of view of a given camera also may influence how the user composes the shot and the quality of the ultimate captured image.

SUMMARY

Traditionally, image sensors use a fixed FOV, whether the camera device is being held in "portrait" orientation or in "landscape" orientation. For camera devices with a relatively limited FOV, e.g., a horizontal FOV of 57° or less, this may result in sub-optimal "selfie" photo-taking conditions. For example, when attempting to compose a "group" selfie while holding the camera device in a "landscape" orientation, the FOV may not be sufficiently wide to capture all the members of the group, even when the camera device is being held by the user at a fully-extended arm's length (estimated at around 50 cm). Conversely, when attempting to compose a traditional, "self-only" selfie while holding the camera device in a "portrait" orientation, typically at a bent-arm's length (estimated at around 30 cm), the camera may be so close to the user's face that the resulting captured image has unwanted perspective distortions, such as exaggerated nose, cheek, and/or forehead sizes, as well as the gaze of the user appearing "cross-eyed." For a standard consumer electronic device camera with a wide angle lens (e.g., a "rear-facing" camera), taking a portrait image requires moving within roughly 30 cm of the subject's face, which could be uncomfortable for the subject and result in a distorted image. A standard camera with a normal lens (i.e., non-wide angle lens) may not have a wide enough field of view to capture typical scenes.

Thus, in some embodiments described herein, an image capture device is disclosed, comprising an image sensor designed to read out a 16:9 aspect ratio (or some other wide-angle aspect ratio), for example, 3840×2160 pixels. In such an exemplary device, a lens with a 79° diagonal FOV would cover the full image sensor diagonal and could be used to produce wide angle landscape images. When the camera device is held in landscape orientation and/or a landscape photo is otherwise selected by the user or the system, the full, wide diagonal FOV may be displayed to the user on a preview screen of the camera device, and the landscape image may be captured in a wide, 16:9 aspect ratio.

When the camera device is held in portrait orientation and/or a portrait photo is selected by the user or the system, a 4:3 aspect ratio image (or some other non-wide-angle aspect ratio), e.g., using an effective 68° diagonal FOV, may be displayed and captured. In this way, the user can hold the camera device in portrait orientation to take self-portraits or make personal video calls. If the user wants to include other people in the photo, include scenery in the photo, or make a video call with multiple people in view, he or she may hold the phone in landscape orientation, allowing the camera will configure itself appropriately and output the wider diagonal FOV, higher resolution and 16:9 aspect ratio image(s).

In other embodiments described herein, if the camera device is detected to be in the portrait orientation, the camera may be configured to be optimized for a portrait or self-portrait image, e.g., using the reduced FOV techniques described above. In one exemplary embodiment, the FOV may be reduced to a 38° or less horizontal FOV (simulating a 50 mm equivalent focal length) so that the user will move the camera device further away, in order to properly frame his or her face in the shot on the camera device's preview display screen. As a result, lens distortion will be reduced, producing a more flattering and natural-looking image. In still other embodiments, the aspect ratio of the captured portrait orientation image may be cropped to a 4:3 aspect ratio, with the crop window shifted over the image sensor so that the user will be inclined to position the camera so that his or her eyes are closer to the lens plane, thus producing a more natural-looking gaze in the portrait or self-portrait image. In still other embodiments, the image data capture by the image sensor may be optically zoomed, cropped, scaled, and/or shifted before being displayed to the user on the camera device's preview display screen, so that the user will naturally be inclined to hold the camera device in a position that will produce an "optimal" portrait or self-portrait image, i.e., avoid as much as possible of the unwanted distortion and unnatural gazes that are typically produced by smaller FOV cameras.

Further embodiments include methods and non-transitory program storage devices, readable by a programmable control device and comprising instructions stored thereon to cause one or more processing units to implement the functionality described herein.

DESCRIPTION

Systems, methods and program storage devices are disclosed, which provide instructions to cause one or more cameras and/or processing units to capture enhanced self-portrait images using a wide diagonal FOV camera. The techniques disclosed herein are applicable to any number of electronic devices with cameras and displays: such as digital cameras, digital video cameras, mobile phones, personal data assistants (PDAs), portable music players, monitors, as well as desktop, laptop, and tablet computer displays.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

Figure 1A:
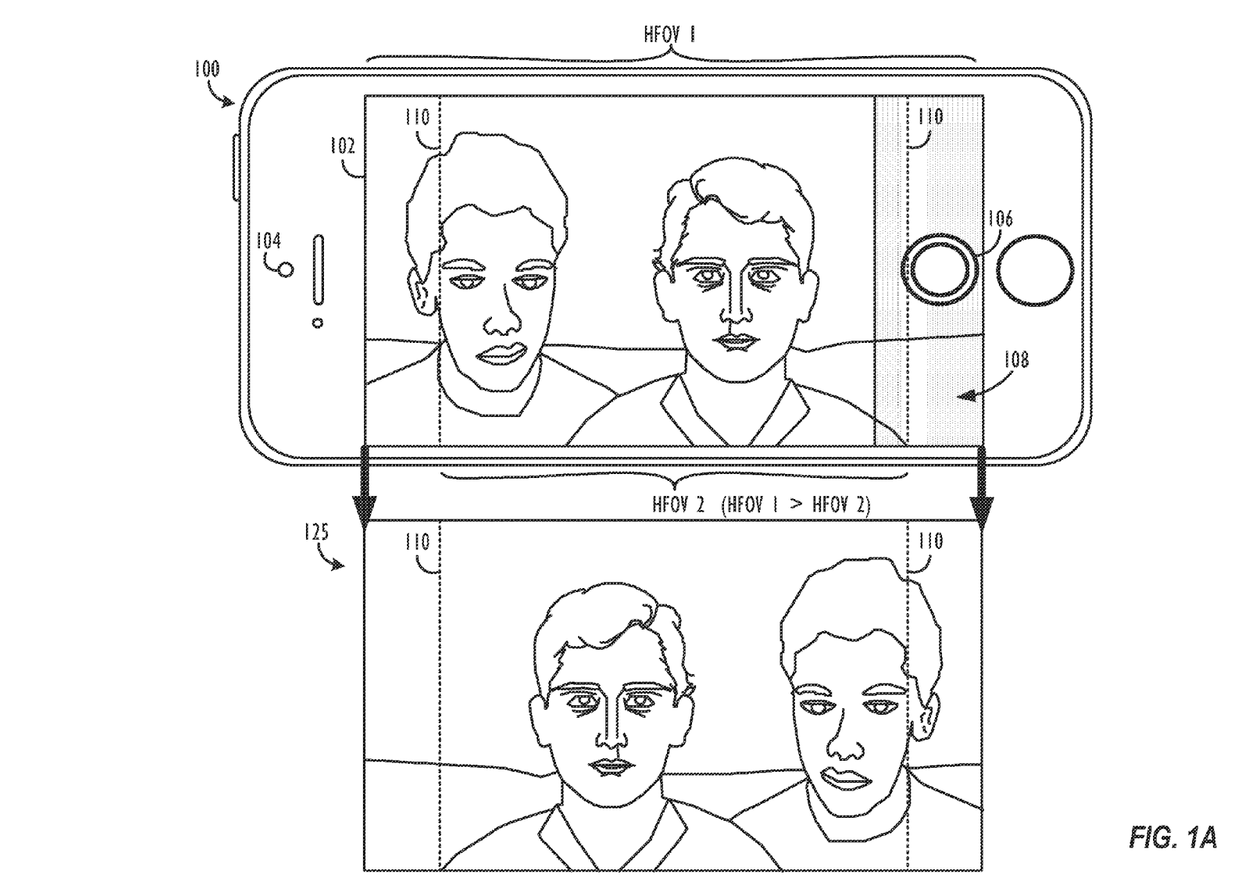
FIG. 1A illustrates an exemplary self-portrait image taken in landscape orientation using a camera device having a wide diagonal FOV lens, in accordance with one embodiment.

Referring now to FIG. 1A, an exemplary self-portrait image taken in landscape orientation 125 using a camera device 100 having a wide diagonal FOV lens is illustrated, in accordance with one embodiment. In some embodiments, image capture device 100 may, e.g., comprise a mobile device having a preview display screen 102, a physical and/or "virtual" shutter button of some sort 106, and a front-facing camera 104 (i.e., a camera lens facing in the same direction as the device's preview display screen 102). As shown in FIG. 1A, the image capture device 100 captures images having a horizontal field of view whose extent is labeled "HFOV1." In some embodiments, a wide FOV lens will be considered one wherein the horizontal FOV of the lens is greater than 63°. In some embodiments, in fact, the horizontal FOV of the lens may be as great as 71°. Also shown in FIG. 1A via dashed lines 110 is an example of the type of image that would be captured by a camera that did not have as wide of a HFOV, i.e., an "HFOV2" that was less than "HFOV1." For example, the image bounded by dashed lines 110 would have a horizontal FOV of closer to 57° in the example depicted. As may now be appreciated, the smaller horizontal FOV image would have cut off a portion of the head of one of the subjects in image 125, and thus produced an undesirable image.

In some embodiments, one or more transparent or semi-transparent user interface (UI) elements 108 may be applied to the preview display screen 102 of device 100 in order allow the user to have access to the virtual shutter 106 (and/or other UI-based photographic control elements), while still being able to view the full wide FOV preview image streamed to the preview display screen.

Figure 1B:
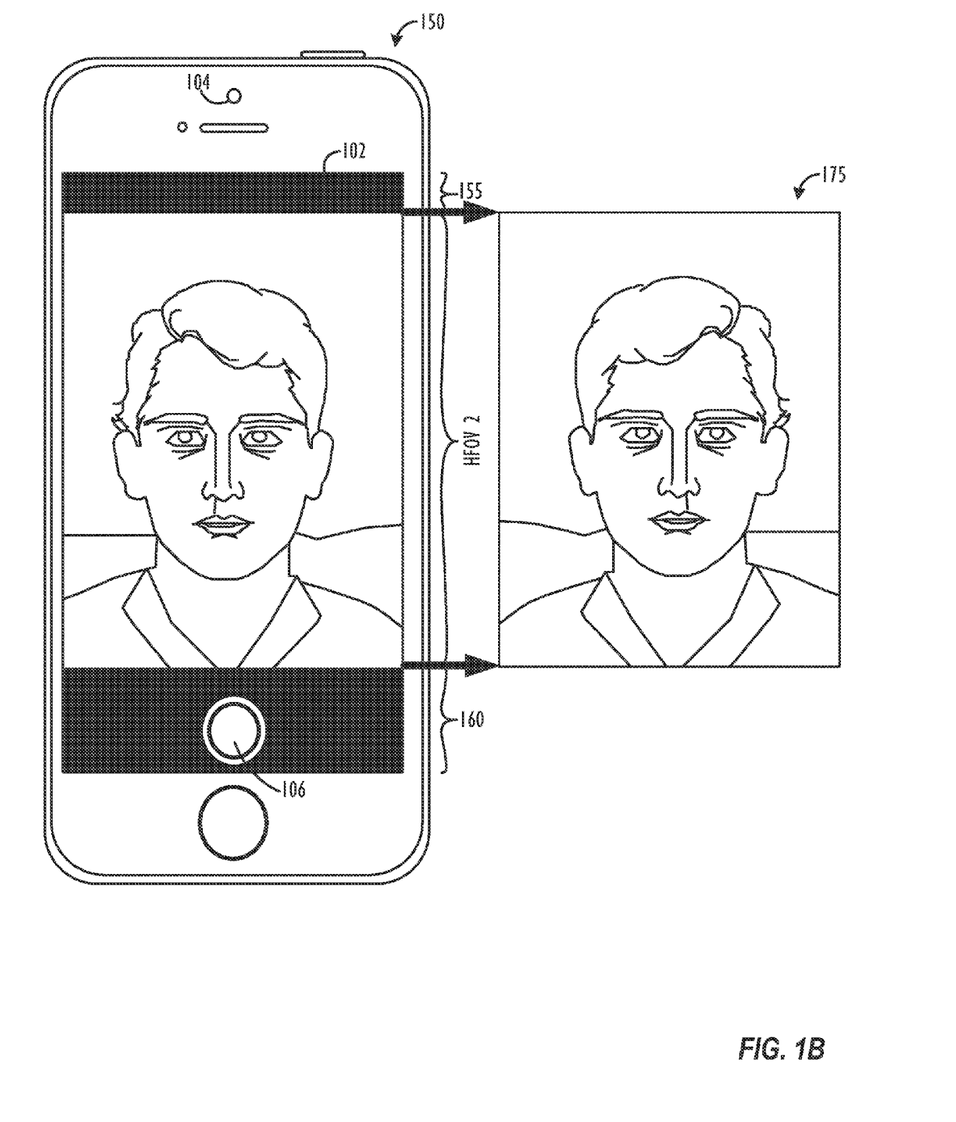
FIG. 1B illustrates an exemplary self-portrait image taken in portrait orientation using a camera device having a wide diagonal FOV lens, in accordance with one embodiment.

Referring now to FIG. 1B, an exemplary self-portrait image taken in portrait orientation 175 using a camera device 150 having a wide diagonal FOV lens is illustrated, in accordance with one embodiment. As shown in FIG. 1B, the image capture device 150 captures images having a horizontal field of view whose extent is labeled "HFOV2." The horizontal field of view "HFOV2" corresponds to the image represented by dashed lines 110 in FIG. 1A that would have been captured if a smaller horizontal FOV was used. Unlike in the landscape orientation example shown in FIG. 1A, a smaller horizontal (and thus diagonal) FOV is often more appropriate for "selfie" images taken with the image capture device in portrait orientation, as there is often only a single subject in the capture image.

One of the difficulties associated with using a wide FOV lens is that the user has to bring the image capture device closer to his or her face in order to take a picture with his or her face taking up a reasonable amount of the image. However, the closer the user places the camera to his or her face, the more perspective distortion is introduced into the capture image, due, e.g., to the greater disparity between the tip of the user's nose and the rest of the user's face. This is one reason why wide FOV lens have typically been disfavored in the prior art for front-facing cameras. In order to avoid the user having to bring the camera very close to his or her face to take a "selfie" in portrait orientation, one embodiment disclosed herein comprises displaying a different cropping of the image captured by the image sensor to the preview display screen of the image capture device based on whether the device is being held in a portrait or a landscape orientation. In this way, the user is able to keep the device at a comfortable viewing distance when snapping the photo, no matter what orientation the device is being held in.

In some embodiments, the cropping of the image captured by the image sensor in portrait orientation may be configured to crop in on the "interesting" part of image, e.g., where the face is likely to be, in portrait mode for self-portraits and video conferencing, etc. In addition to software-implemented face detection routines, structured light, IR cameras, or other sensors could be used to try and determine what object or objects the user is intending to be the subject of interest in the composed portrait image.

In some embodiments, one or more opaque or semi-opaque user interface (UI) elements (e.g., 155/160) may be applied to the preview display screen 102 of device 100 in order to limit the FOV of the preview image streamed to the preview display screen to the desired portrait orientation aspect ratio.

Figure 2A:
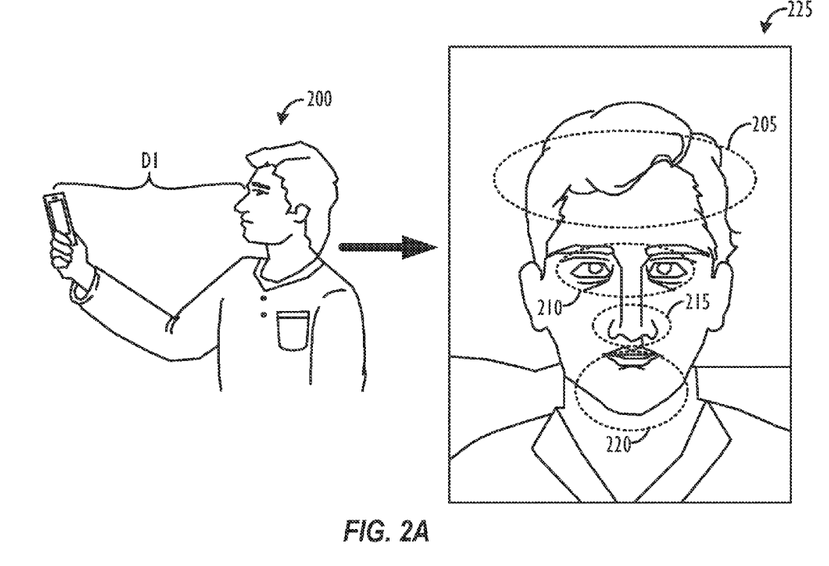
FIG. 2A illustrates an exemplary self-portrait image taken in portrait orientation at bent-arm's length, in accordance with one embodiment.

Referring now to FIG. 2A, an exemplary self-portrait image 225 taken in portrait orientation at bent-arm's length is illustrated, in accordance with one embodiment. Image 225 represents a portrait orientation "selfie" image taken by user 200 with his arm partially bent, e.g., at a distance (D1) of about 30 cm from his face. It has been empirically found that this is a comfortable reading distance and a distance that users will instinctively tend to hold the device when taking portrait orientation "selfie" images. However, this "default" distance that users tend to hold the image capture device at away from their face may lead to perspective distortions in a resultant image 225 captured by a wide FOV lens. In particular, holding the camera too close to the user's face may cause distortion in the user's nose (215), cheeks/chin (220), and/or forehead (205), as well as causing the gaze of the user to appear somewhat "cross-eyed" (210). These distortions often result in an unnatural and unflattering appearance for the user in the "selfie" image.

Figure 2B:
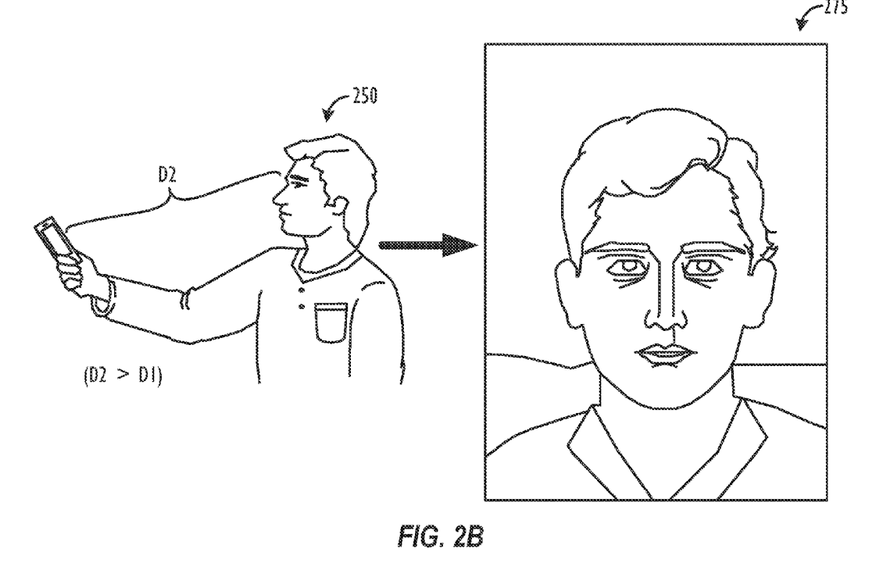
FIG. 2B illustrates an exemplary self-portrait image taken in portrait orientation at fully-extended arm's length, in accordance with one embodiment.

Referring now to FIG. 2B, an exemplary self-portrait image 275 taken in portrait orientation at fully-extended arm's length is illustrated, in accordance with one embodiment. Image 275 represents a portrait orientation "selfie" image taken by user 200 with his arm fully-extended, e.g., at a distance (D2) of about 50 cm from his face. It has been empirically found that this distance is more commonly used when users are attempting to take a "landscape" orientation "group" image composed of more than one subject. By holding a wide FOV camera lens at this longer distance, D2, the improved image capture device may intelligently crop the larger FOV image captured by the front-facing camera in order to frame the face of the subject in the center of the image that will be streamed to the image capture device's preview display screen. In doing so, the user's gaze will appear to be "closer" to the camera and user's nose, cheeks/chin, and forehead will appear less distorted, resulting in a more natural and flattering appearance for the user in the "selfie" image.

Figure 2C:
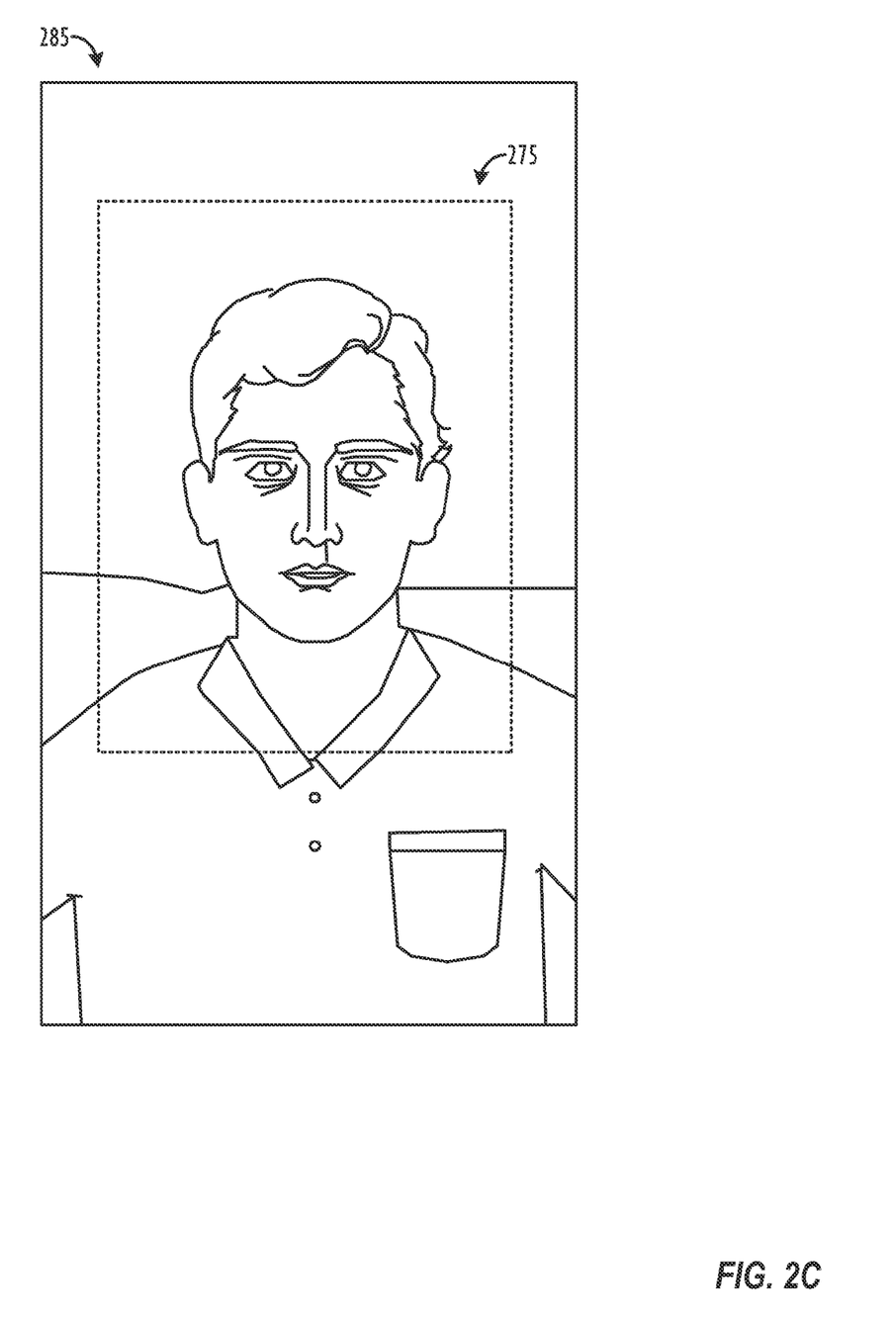
FIG. 2C illustrates an exemplary 4:3 aspect ratio self-portrait image crop taken from a portrait orientation image captured by a 16:9 aspect ratio wide diagonal FOV image sensor, in accordance with one embodiment.

Referring now to FIG. 2C, an exemplary 4:3 aspect ratio self-portrait image crop 275 taken from a portrait orientation image captured by a 16:9 aspect ratio wide diagonal FOV image sensor 285 is illustrated, in accordance with one embodiment. FIG. 2C illustrates the particular cropped part 275 of the exemplary wide FOV captured image 285 that will be displayed on the preview display screen of the device in FIG. 2B. As mentioned above, according to some embodiments, the cropping of the image captured by the image sensor in portrait orientation may be configured to crop in on the "interesting" part of image, e.g., where the face is likely to be. In some embodiments, the selected cropped region of the full, wide FOV image may be based on some factor(s) other than face detection, such as object recognition, focus, exposure, and/or coloration. In still other embodiments, the selected cropped region of the full, wide FOV image may be selected manually by the user or system in post-processing, i.e., after the image has been captured. For example, a face detection algorithm could be used as a post-process to create optimized portrait images from a source image. The full, e.g., 16:9 aspect ratio source image, could then be saved to memory, along with the metadata defining the determined cropped view.

Figure 3A:
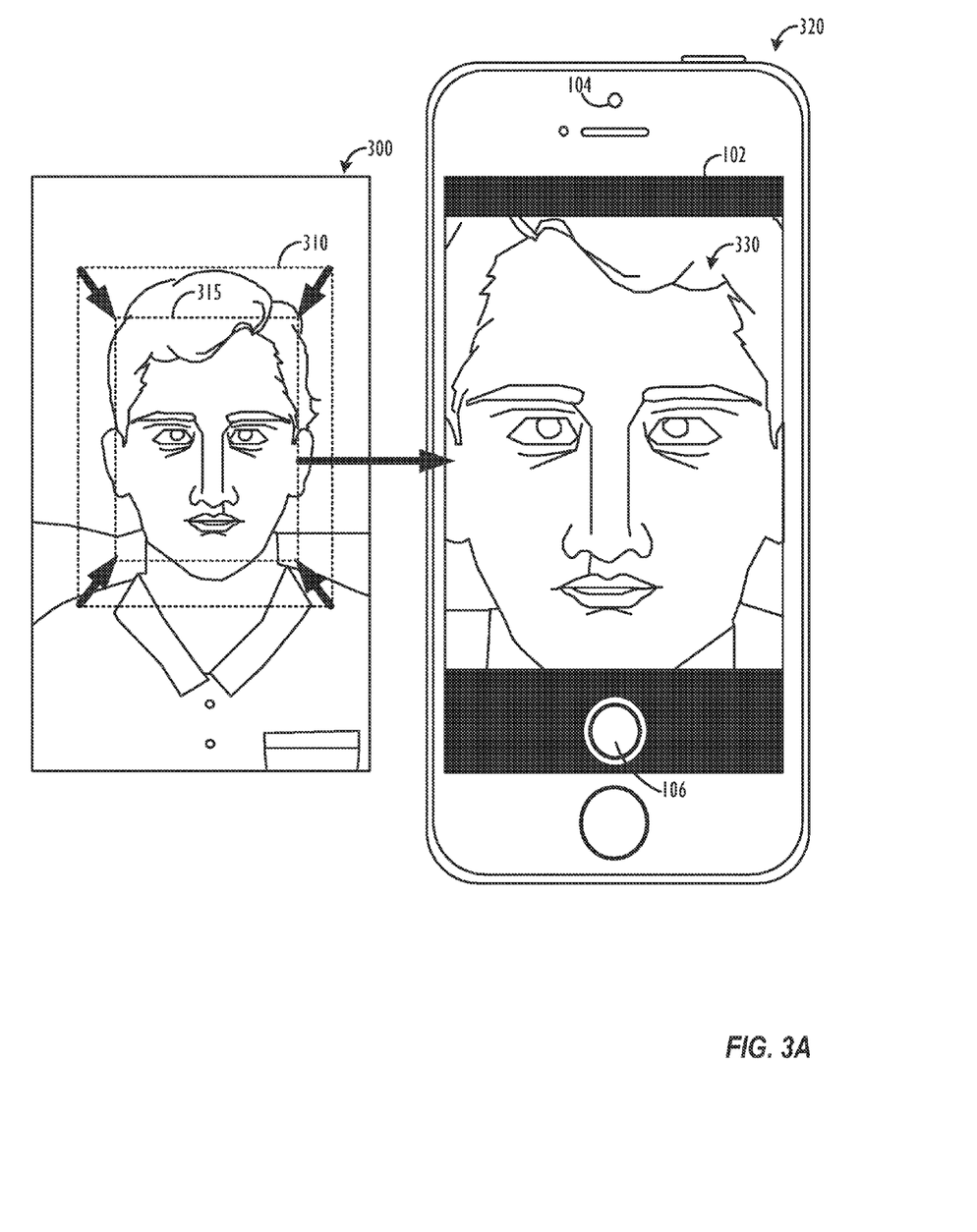
FIG. 3A illustrates an exemplary scaled 4:3 aspect ratio self-portrait image crop taken from a portrait orientation image captured by a 16:9 aspect ratio wide diagonal FOV image sensor and displayed on a camera device's preview display screen, in accordance with one embodiment.

Referring now to FIG. 3A, an exemplary scaled 4:3 aspect ratio self-portrait image crop 330 taken from a portrait orientation image captured by a 16:9 aspect ratio wide diagonal FOV image sensor 300 and displayed on a camera device 320's preview display screen 102 is illustrated, in accordance with one embodiment. As explained above, according to some embodiments, an intelligent image capture device may optically zoom, crop, scale, and/or shift a captured image before it is displayed to the user on the device's preview display screen based, at least in part on scene content, so that the user will naturally be inclined to hold the camera device in a position that will produce a more "optimal" self-portrait image, i.e., avoid the unwanted distortion and unnatural gazes referred to above.

In the example of FIG. 3A, the user is holding the device too close to his face to capture an optimal self-portrait, and so the image capture device has intelligently determined the relevant portion of the image 310 having a particular location within the image and a particular shape (i.e., a box sized to frame the location of the user's face) and then scaled up a cropped portion 315 of the relevant portion 310 and displayed it on the device's preview screen, resulting in the "zoomed in" look to the 4:3 aspect ratio self-portrait image crop 330 displayed to the user on the preview display screen 102 of camera device 320. In some embodiments, the determination of the size and shape of the relevant portion of the image 310 may be based, at least in part, on the understanding that a user taking a portrait or self-portrait image will naturally move the device in a particular direction/orientation, so that the subject's entire face will appear on the preview display screen 102 before the image is captured. In the example of FIG. 3A, the "zoomed in" look to the user's face on the preview display screen 102 will cause the user to end up holding the device at distance more akin to the D2 distance in FIG. 2B, resulting in a more optimal "selfie" image with less distortion in the user's face. According to some embodiments, this "zoomed in" effect could be active at all times that the device is being held in portrait orientation while the front-facing camera is active so that a user never takes a "selfie" at the "too close" range, such as the D1 distance in FIG. 2A.

Figure 3B:
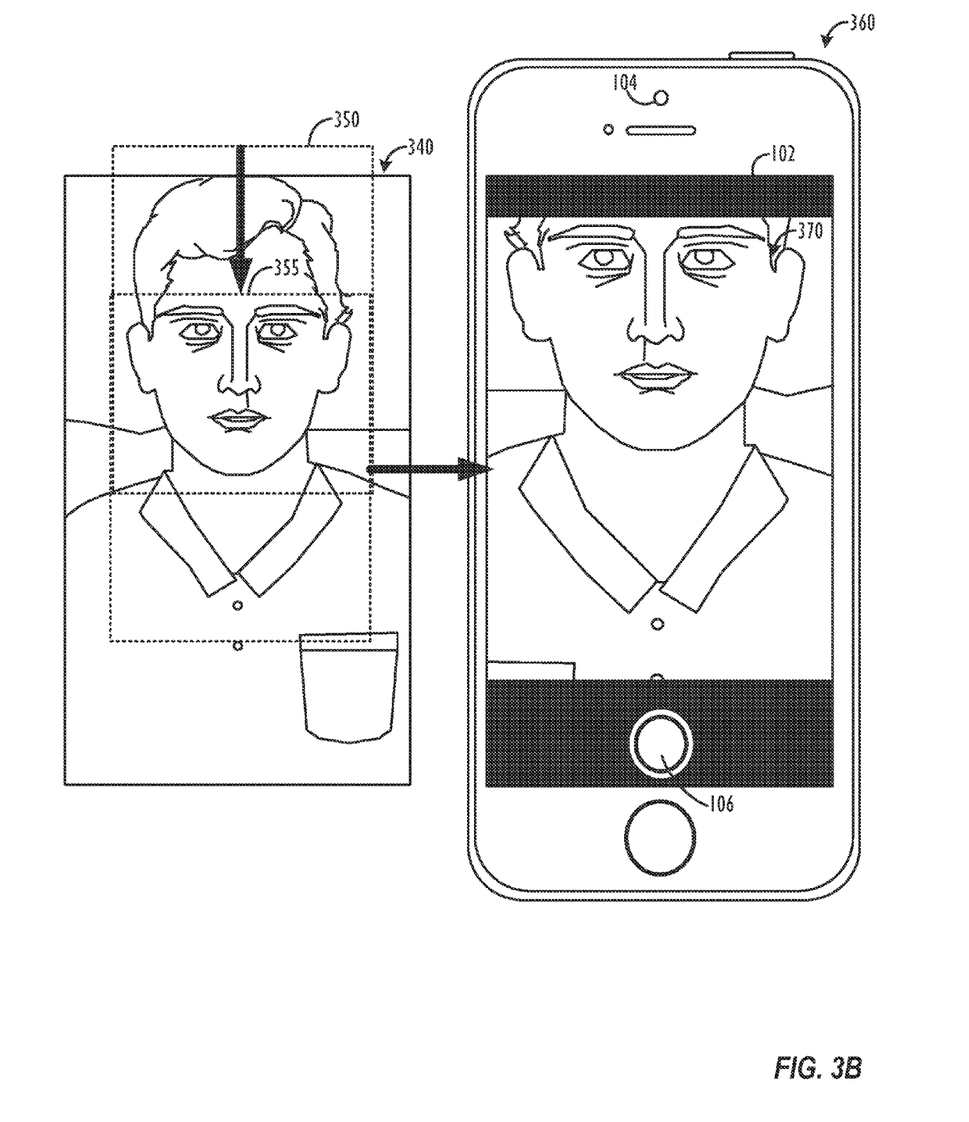
FIG. 3B illustrates an exemplary shifted 4:3 aspect ratio self-portrait image crop taken from a portrait orientation image captured by a 16:9 aspect ratio wide diagonal FOV image sensor and displayed on a camera device's preview display screen, in accordance with one embodiment.

Referring now to FIG. 3B, an exemplary shifted 4:3 aspect ratio self-portrait image crop 370 taken from a portrait orientation image captured by a 16:9 aspect ratio wide diagonal FOV image sensor 340 and displayed on a camera device 360's preview display screen 102 is illustrated, in accordance with one embodiment. In the example of FIG. 3B, the user is holding the device too low with respect to his face to capture an optimal self-portrait (which are generally taken with the camera perpendicular to—or above—the user's eye level), and so the image capture device has intelligently determined the relevant portion of the image 350 having a particular location within the image and a particular shape (i.e., a box sized to frame the location of the user's face) and then cropped out a shifted portion of the image 355 (i.e., a portion shifted down from the current location of the user's face) and displayed it on the device's preview screen, resulting in the "chopped off" look to the 4:3 aspect ratio self-portrait image crop 370 displayed to the user on the preview display screen 102 of camera device 360 (i.e., the top portion of the subject's head is "chopped off" from the image shown on preview display screen 102). This will naturally lead the user to move the device farther "upwards" with respect to his face so that his entire face will appear on the preview display screen 102. In doing so, the user will end up holding the device at a more optimal "selfie" image-taking angle, resulting in less distortion in the user's face and a more flattering overall appearance in the resultant captured image. It is to be understood that the shifting could take place in any direction or combination of directions in order to better position the user for a more optimal portrait image, and that the aforementioned scaling techniques could likewise be used in combination with the described shifting techniques in order to better position the user for a more optimal portrait or self-portrait image. Further, the amount of scaling and/or shifting applied to the relevant portion of the image that is displayed on the image capture device's preview display screen will be determined, based at least in part, on the amount of re-positioning and/or re-orienting of the image capture device that needs to be performed by the user in order to result in a more optimal self-portrait image.

In some embodiments, the intelligent image capture device could alternately (or additionally) provide other UI cues, e.g., arrows, haptic feedback, visual or audible instructions, etc. to coax the user to move the device into a more optimal selfie-taking position. In other embodiment, such UI cues could gradually fade from the UI as the image capture device is moved into the more optimal position. In yet other embodiments, the intelligent image capture device could alternately (or additionally) utilize one or more positional sensors within the device (e.g., gyrometer, accelerometer, barometer, altimeter, etc.) to coax the user into holding the device at a more optimal selfie-taking position (e.g., a more optimal tilt, height, angle, etc., with respect to the user). In still other embodiments, as the user is moving the image capture device to the determined more optimal height, angle, FOV, etc., the device could automatically be capturing images and then save and present all images to the user for later selection or a preferred image(s), and/or the device could save and present only those images that are determined to be the most optimally-composed.

Figure 4:
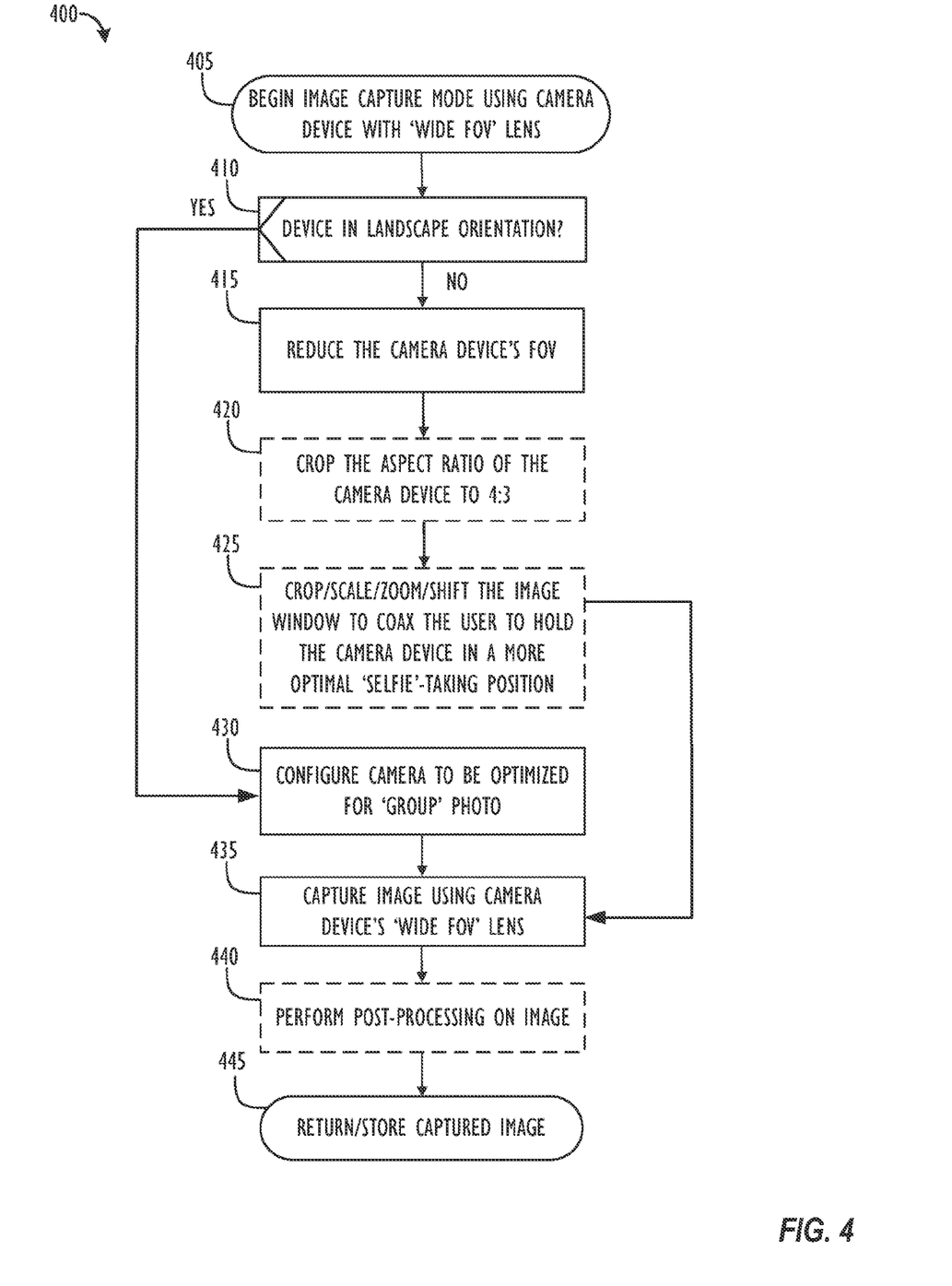
FIG. 4 is a flowchart illustrating a method of capturing enhanced self-portrait images using a wide diagonal FOV camera, in accordance with one embodiment.

Referring now to FIG. 4, a flowchart 400 illustrating a method of capturing enhanced self-portrait images using an image capture device having a wide diagonal FOV camera is illustrated, in accordance with one embodiment. First, the process may start with the camera device beginning to operate in an "image capture" mode using a wide diagonal FOV lens (Step 405). On some camera devices, this may comprise displaying a "live feed" of the images being captured by the camera device's image sensor on a preview display screen on the device. During this image capture mode, the camera device may determine whether the device is in landscape orientation (or, alternatively, in portrait orientation) (Step 410). This determination may be made by using any one or more of a number of positional sensors disposed within the image capture device, e.g., an accelerometer, gyrometer, or the like.

If, at Step 410 it is determined that the image capture device is in landscape orientation, the process may proceed to Step 430. In some implementations, the determination of the image capture device's orientation may be based on whether the device has been rotated more than a threshold angle off its vertical axis, such that it is then positioned in a second orientation that is substantially orthogonal to its first orientation. For example, the image capture device may be deemed to be in a "portrait" orientation until it is rotated more than 60° (in any direction) off its vertical axis, at which point it would be deemed to be in a "landscape" orientation. At Step 430, the process may configure the camera to be optimized for a "group" photo. According to some embodiments, this may simply entail using the full diagonal FOV of the image sensor. In other embodiments, this may entail adding one or more transparent UI elements on the sides of the preview display screen, as described above in reference to FIG. 1A. In still other embodiments, this may entail performing face detection, face recognition, auto focusing, auto exposure, etc.

If, instead, at Step 410 it is determined that the image capture device is not in landscape orientation (i.e., is in portrait orientation), the process may proceed to Step 415. At Step 415, the camera device may reduce its FOV, e.g., by any of the methods discussed above, such as optically zooming, cropping and/or scaling the image obtained by the image sensor to have a smaller effective FOV. In some embodiments, reducing the device's FOV may also optionally comprise cropping the camera device to an aspect ratio of 4:3, or another aspect ratio desirable for portraits (Step 420). [Dashed line boxes in FIG. 4 indicate that a particular Step may be optionally performed in some embodiments.] Next the image capture device may apply one or more FOV effects, e.g., optically zooming, cropping, scaling, or shifting, the image captured by the image sensor in order to coax the user to hold the image capture device in a more optimal portrait-taking position (Step 425). These techniques are described in greater detail above with reference to FIGS. 3A and 3B.

Once the camera of the image capture device has been configured for the a landscape or portrait-orientation image capture, the process may proceed to Step 435, wherein the image is captured by the image capture device according to how the camera has been configured. Next, any desired post-processing may be performed on the captured image, e.g., cropping, shifting, scaling, color balancing, etc. (Step 440). Finally, the captured image is returned to the calling application and/or stored in memory, either on-board the image capture device or communicatively coupled to the image capture device (Step 445).

Figure 5:
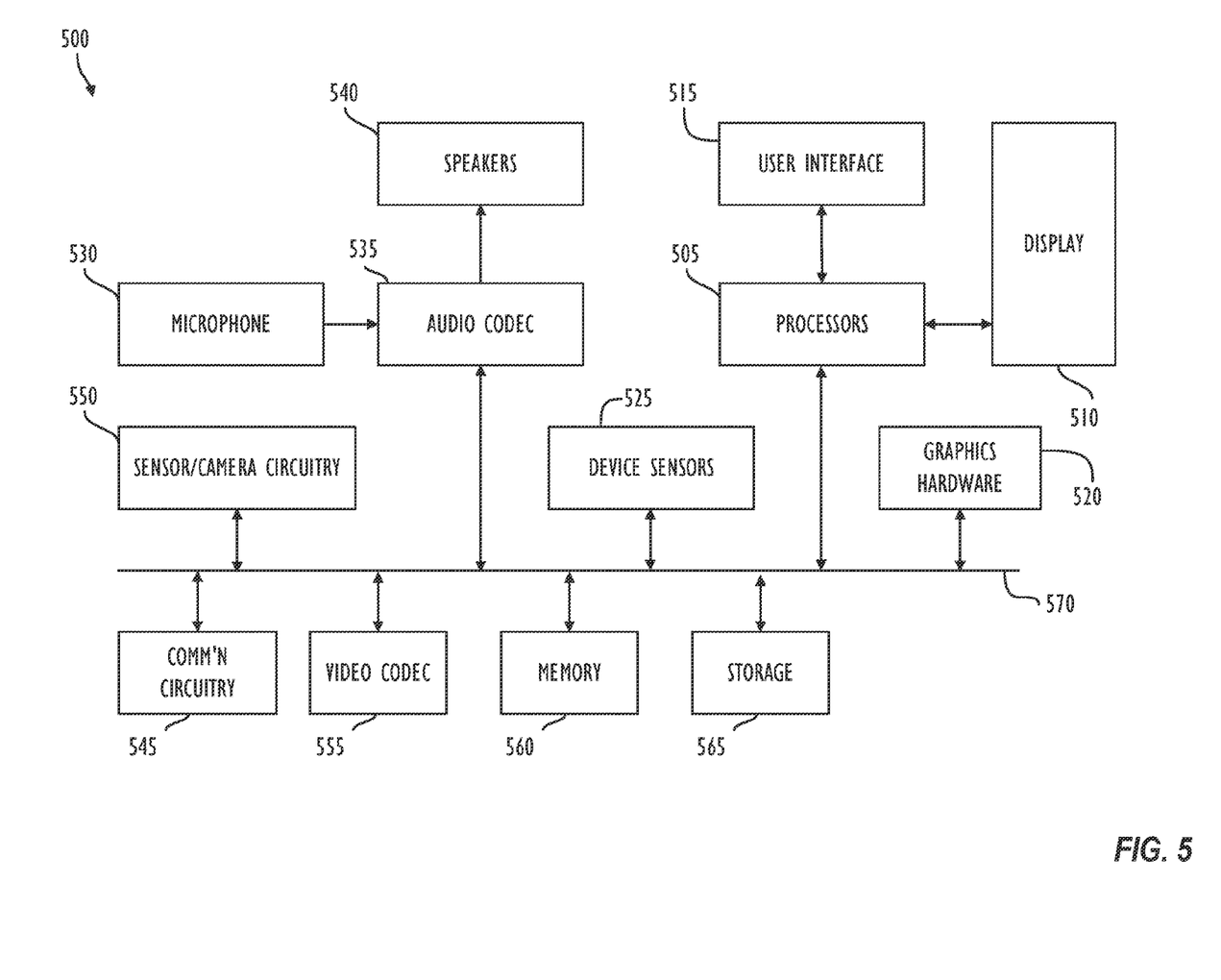
FIG. 5 illustrates a simplified functional block diagram of an illustrative electronic image capture and display device, according to one embodiment.

FIG. 5 is a simplified functional block diagram of an illustrative electronic device for image capture and display, according to one embodiment. Electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, digital image capture unit 550, video codec(s) 555, memory 560, storage 565, and communications bus 570. Electronic device 500 may be, for example, a personal digital assistant (PDA), personal music player, a mobile telephone, or a notebook, laptop or tablet computer system.

Processor 505 may execute instructions necessary to carry out or control the operation of many functions performed by device 500 (e.g., such as the generation and/or processing of time-lapse video in accordance with operation 100). Processor 505 may, for instance, drive display 510 and receive user input from user interface 515. User interface 515 can take a variety of forms, such as a button, keypad, dial, a click wheel, keyboard, display screen and/or a touch screen. Processor 505 may be a system-on-chip such as those found in mobile devices and include a dedicated graphics processing unit (GPU). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 process graphics information. In one embodiment, graphics hardware 520 may include a programmable graphics processing unit (GPU).

Sensor and camera circuitry 550 may capture still and video images that may be processed to generate images in accordance with this disclosure. As mentioned above, the image sensor may comprise a lens with a wide diagonal FOV, such as 75° or greater (corresponding to a 35 mm equivalent 28 mm focal length lens). Output from camera circuitry 550 may be processed, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 may include one or more different types of media used by processor 505, graphics hardware 520, and image capture circuitry 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a programmable control device and comprising instructions stored thereon to cause one or more processing units to:
   receive a first image from a stream of images from a camera in a device, wherein the device is oriented in a first orientation during the capture of the first image, and wherein the camera is configured, according to the first orientation, to capture the first image with a first field of view;
   cause the device to display the first image on a display of the device for a preview, with a first effective field of view that is different than the first field of view;
   determine that the device is oriented in a second orientation, wherein the second orientation is within a first threshold angle of being orthogonal to the first orientation;
   receive a second image from the stream of images, wherein the device is oriented in the second orientation during the capture of the second image, and wherein the camera is configured, according to the second orientation, to capture the second image with the first field of view;
   configure the second image to comprise a second effective field of view in response to the determination that the device is oriented in the second orientation;
   cause the device to display the second image on the display of the device for a preview, with the second effective field of view,
   wherein the first effective field of view is different than the second effective field of view; and
   store at least one of the first image or the second image in a memory in response to a user command.

2. The non-transitory program storage device of claim 1, wherein the first orientation comprises a landscape orientation, and wherein the second orientation comprises a portrait orientation.

3. The non-transitory program storage device of claim 2, wherein the first effective field of view is larger than the second effective field of view.

4. The non-transitory program storage device of claim 2, wherein the first effective field of view comprises a diagonal field of view of greater than 75 degrees, and wherein the second effective field of view comprises a diagonal field of view of less than 75 degrees.

5. The non-transitory program storage device of claim 1,
wherein the instructions to configure the second image to comprise a second effective field of view further comprise instructions to crop a portion of the second image to comprise a first relevant portion having a first location and a first shape,
wherein the instructions to cause the device to display the second image on the display of the device further comprise instructions to cause the device to display the first relevant portion of the second image on the display of the device, and
wherein the first location and first shape of the first relevant portion are based, at least in part, on a determination that displaying the first relevant portion will result in a user of the device orienting the device in a more optimal position for the capture of a portrait or self-portrait image.

6. The non-transitory program storage device of claim 1,
wherein the instructions to configure the second image to comprise a second effective field of view further comprise instructions to scale a portion of the second image to comprise a first relevant portion having a first location and a first shape,
wherein the instructions to cause the device to display the second image on the display of the device further comprise instructions to cause the device to display the first relevant portion of the second image on the display of the device, and
wherein the first location and first shape of the first relevant portion are based, at least in part, on a determination that displaying the first relevant portion will result in a user of the device orienting the device in a more optimal position for the capture of a portrait or self-portrait image.

7. The non-transitory program storage device of claim 1,
wherein the instructions to configure the second image to comprise a second effective field of view further comprise instructions to shift a portion of the second image to comprise a first relevant portion having a first location and a first shape,
wherein the instructions to cause the device to display the second image on the display of the device further comprise instructions to cause the device to display the first relevant portion of the second image on the display of the device, and
wherein the first location and first shape of the first relevant portion are based, at least in part, on a determination that displaying the first relevant portion will result in a user of the device orienting the device in a more optimal position for the capture of a portrait or self-portrait image.

8. An electronic device comprising:
a camera;
a display;
an image sensor;
a memory operatively coupled to the image sensor; and
at least one processor operatively coupled to the memory and the image sensor, wherein the at least one processor is programmed to:
receive a first image from a stream of images from the camera, wherein the electronic device is oriented in a first orientation during the capture of the first image, and wherein the camera is configured, according to the first orientation, to capture the first image with a first field of view;
cause the electronic device to display the first image on the display of the electronic device for a preview, with a first effective field of view that is different than the first field of view;
determine that the electronic device is oriented in a second orientation, wherein the second orientation is within a first threshold angle of being orthogonal to the first orientation;
receive a second image from the stream of images, wherein the electronic device is oriented in the second orientation during the capture of the second image, and wherein the camera is configured, according to the second orientation, to capture the second image with the first field of view;
configure the second image to comprise a second effective field of view in response to the determination that the electronic device is oriented in the second orientation;
cause the electronic device to display the second image on the display of the electronic device for a preview, with the second effective field of view,
wherein the first effective field of view is different than the second effective field of view; and
store at least one of the first image or the second image in the memory in response to a user command.

9. The electronic device of claim 8, wherein the first orientation comprises a landscape orientation, and wherein the second orientation comprises a portrait orientation.

10. The electronic device of claim 9, wherein the first effective field of view is larger than the second effective field of view.

11. The electronic device of claim 9, wherein the first effective field of view comprises a diagonal field of view of greater than 75 degrees, and wherein the second effective field of view comprises a diagonal field of view of less than 75 degrees.

12. The electronic device of claim 8,
wherein the at least one processor is further programmed to configure the second image by cropping a portion of the second image to comprise a first relevant portion having a first location and a first shape,
wherein the at least one processor is further programmed to cause the electronic device to display only the first relevant portion of the second image on the display of the electronic device, and
wherein the first location and first shape of the first relevant portion are based, at least in part, on a determination that displaying the first relevant portion will result in a user of the electronic device orienting the electronic device in a more optimal position for the capture of a portrait or self-portrait image.

13. The electronic device of claim 8,
wherein the at least one processor is further programmed to configure the second image by scaling a portion of the second image to comprise a first relevant portion having a first location and a first shape,
wherein the at least one processor is further programmed to cause the electronic device to display only the first relevant portion of the second image on the display of the electronic device, and
wherein the first location and first shape of the first relevant portion are based, at least in part, on a determination that displaying the first relevant portion will result in a user of the electronic device orienting the electronic device in a more optimal position for the capture of a portrait or self-portrait image.

14. The electronic device of claim 8,
wherein the at least one processor is further programmed to configure the second image by shifting a portion of the second image to comprise a first relevant portion having a first location and a first shape,
wherein the at least one processor is further programmed to cause the electronic device to display only the first relevant portion of the second image on the display of the electronic device, and
wherein the first location and first shape of the first relevant portion are based, at least in part, on a determination that displaying the first relevant portion will result in a user of the electronic device orienting the electronic device in a more optimal position for the capture of a portrait or self-portrait image.

15. A non-transitory program storage device, readable by a programmable control device and comprising instructions stored thereon to cause one or more processing units to:
receive a first image from a camera in a device, wherein the device is oriented in a first orientation during the capture of the first image, and wherein the first image is captured with a first field of view;
cause the device to display the first image on a display of the device with a first effective field of view that is different than the first field of view;
determine that the device is oriented in a second orientation, wherein the second orientation is within a first threshold angle of being orthogonal to the first orientation;
receive a second image from the camera in the device, wherein the device is oriented in the second orientation during the capture of the second image, and wherein the second image is captured with the first field of view;
configure the second image to comprise a second effective field of view in response to the determination that the device is oriented in the second orientation;
select a first relevant portion of the second image, the first relevant portion comprising a first location and a first shape within the second image; and
cause the device to display the first relevant portion of the second image on the display of the device,
wherein the first effective field of view is different than the second effective field of view, and
wherein the first location and first shape of the first relevant portion are based, at least in part, on a determination that displaying the first relevant portion will result in a user of the device orienting the device in a more optimal position for the capture of a portrait or self-portrait image.

16. The non-transitory program storage device of claim 15, wherein the first orientation comprises a landscape orientation, and wherein the second orientation comprises a portrait orientation.

17. The non-transitory program storage device of claim 16, wherein the first effective field of view is larger than the second effective field of view.

18. The non-transitory program storage device of claim 16, wherein the first effective field of view comprises a diagonal field of view of greater than 75 degrees, and wherein the second effective field of view comprises a diagonal field of view of less than 75 degrees.

19. The non-transitory program storage device of claim 15, wherein the instructions to select a first relevant portion of the second image further comprise instructions to:
crop a portion of the second image.

20. The non-transitory program storage device of claim 15, wherein the instructions to select a first relevant portion of the second image further comprise instructions to:
scale a portion of the second image.

21. The non-transitory program storage device of claim 15, wherein the instructions to select a first relevant portion of the second image further comprise instructions to:
shift a portion of the second image.

22. An electronic device comprising:
a camera;
a display;
an image sensor;
a memory operatively coupled to the image sensor; and
at least one processor operatively coupled to the memory and the image sensor, wherein the at least one processor is programmed to:
receive a first image from the camera, wherein the device is oriented in a first orientation during the capture of the first image, and wherein the first image is captured with a first field of view;
cause the electronic device to display the first image on the display with a first effective field of view that is different than the first field of view;
determine that the electronic device is oriented in a second orientation, wherein the second orientation is within a first threshold angle of being orthogonal to the first orientation;
receive a second image from the camera, wherein the electronic device is oriented in the second orientation during the capture of the second image, and wherein the second image is captured with the first field of view;
configure the second image to comprise a second effective field of view in response to the determination that the electronic device is oriented in the second orientation;
select a first relevant portion of the second image, the first relevant portion comprising a first location and a first shape within the second image; and
cause the electronic device to display the first relevant portion of the second image on the display of the electronic device,
wherein the first effective field of view is different than the second effective field of view, and
wherein the first location and first shape of the first relevant portion are based, at least in part, on a determination that displaying the first relevant portion will result in a user of the electronic device orienting the electronic device in a more optimal position for the capture of a portrait or self-portrait image.

23. The electronic device of claim 22, wherein the first orientation comprises a landscape orientation, and wherein the second orientation comprises a portrait orientation.

24. The electronic device of claim 23, wherein the first effective field of view is larger than the second effective field of view.

25. The electronic device of claim 23, wherein the first effective field of view comprises a diagonal field of view of greater than 75 degrees, and wherein the second effective field of view comprises a diagonal field of view of less than 75 degrees.

26. The electronic device of claim 22, wherein the at least one processor is further programmed to select the first relevant portion of the second image by:
cropping a portion of the second image.

27. The electronic device of claim 22, wherein the at least one processor is further programmed to select the first relevant portion of the second image by:
   scaling a portion of the second image.

28. The electronic device of claim 22, wherein the at least one processor is further programmed to select the first relevant portion of the second image by:
   shifting a portion of the second image.

\* \* \* \* \*